United States Patent

[11] 3,580,541

[72] Inventor Marcel Bouhot
 35 Avenue du General Sarrail, Paris,
 France
[21] Appl. No. 4,995
[22] Filed Jan. 22, 1970
[45] Patented May 25, 1971
[32] Priority Jan. 27, 1969
[33] France
[31] 6,901,529

[54] COCK
 6 Claims, 3 Drawing Figs.
[52] U.S. Cl. .................................................. 251/174,
 251/172, 251/317
[51] Int. Cl. .................................................. F16k 5/06
[50] Field of Search........................................... 251/172,
 174

[56] References Cited
UNITED STATES PATENTS
2,696,967 12/1954 Wilson .......................... 251/174
2,857,129 10/1958 Overholser ................... 251/174X
3,266,769 8/1966 Shand............................ 251/172

*Primary Examiner*—Harold W. Weakley
*Attorney*—Young and Thompson

ABSTRACT: A cock comprising a body, a closure member displaceable within said body so as to establish or interrupt a communication between two orifices formed in opposite relation within said body and in the vicinity of each orifice a seal engaging said closure member. Each seal comprises a tubular ring of polytetrafluoroethylene which is engaged in a recess formed in the body and in fluidtight contact with a packing fitted in the wall of said recess; the tubular ring is provided with a deformable lip applied by a washer in fluidtight contact with the closure member. Owing to this arrangement, the polytetrafluoroethylene lip does not creep and the packing fitted in the wall of the recess is not caused to swell.

Patented May 25, 1971
3,580,541
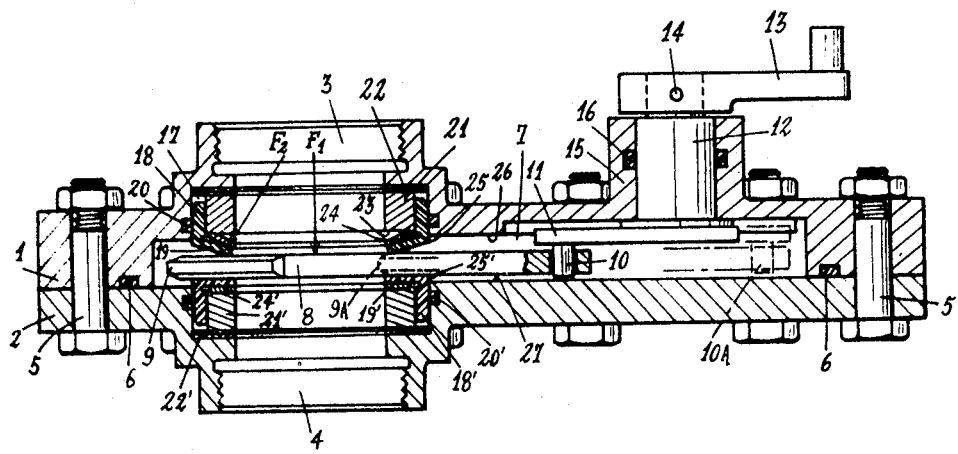
Fig.1
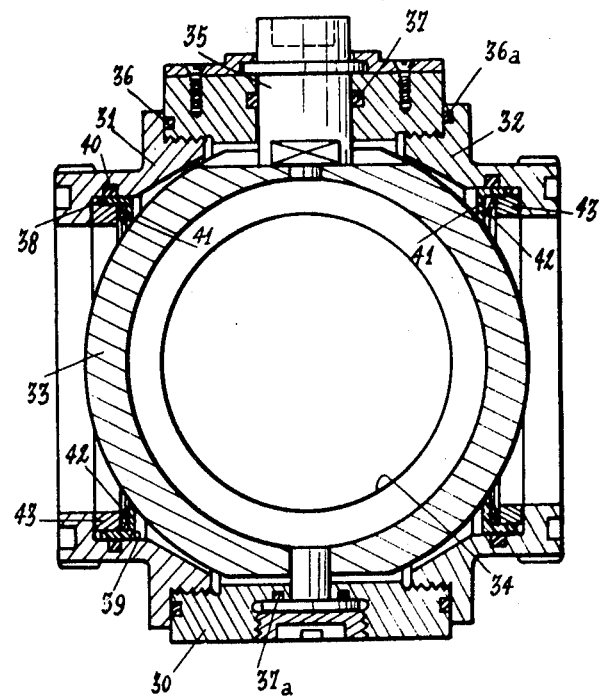
Fig.2
Fig.3
INVENTOR
MARCEL BOUHOT
BY Young + Thompson
ATTYS.

COCK

This invention relates to a cock having a closure member which is displaceable in such a manner as to establish or interrupt a communication between two inlet and outlet orifices.

In cocks of this type, seals are fitted in the vicinity of each orifice in such a manner as to be applied against the closure member.

In the case of cocks in which the closure member is a diaphragm consisting of a flat plate of small thickness which is slidably fitted within a cock body formed of two casing elements and which is actuated by a crank handle and shaft system, the seals referred to are usually rubber O-ring seals fitted in circular grooves which are formed in the casing elements. These two O-ring seals and especially the seal against which the diaphragm is applied when subjected to the pressure exerted by the fluid are highly compressed when the diaphragm is in the closed position.

If the fluid referred to is either air or a gas, the coefficient of friction of steel on rubber both at the time of starting and during operation is relatively high and a substantial effort is therefore required in order to operate the cock. If the cock remains inoperative over an appreciable period of time, the seal tends to adhere to the diaphragm. The operating effort is thereby increased and the seal is also liable to be displaced from its groove and to cause jamming of the cock.

In order to prevent this unseating of seals, it is customary practice to machine the grooves in which the seals are to be fitted to a depth which is very slightly smaller than the diameter of the chord of the seal. If the pressure of the fluid increases, the seal against which the diaphragm is applied as a result of said pressure can be compressed to such an extent that the diaphragm is applied directly against the internal face of the casing. The operating effort increases and seizure is liable to arise.

These disadvantages, although of lesser magnitude, are nevertheless still present in the case of liquids. And even in the case of hydrocarbides, such disadvantages can be made worse by the fact that the seals swell in the presence of these liquids and this has the effect of increasing the pressure force exerted by the two seals on the diaphragm against which these latter are applied.

When the material known as polytetrafluoroethylene was originally developed by the chemical industry and made available to technicians, consideration was given to its use in the fabrication of seals for cocks and valves. In addition to its outstanding resistance to chemical agents, this material is deformable but inelastic and has the advantage of affording a very low coefficient of friction in contact with metals. It has been proposed, for example, to fit within the usual circular grooves which are suitably increased in depth for this purpose and in addition to the rubber O-ring seal which is placed at the bottom of the groove a flat annular washer formed of polytetrafluoroethylene which is interposed between the O-ring seal and the diaphragm and maintained applied against this latter as a result of the elasticity of the rubber. Thus, the flat annular washer is intended to ensure leak-tightness opposite to the diaphragm. As a result of initial compression, the O-ring seal additionally ensures leak-tightness between the inlet orifice (or outlet orifice) and the casing on the one hand and the polytetrafluoroethylene washer on the other hand. If said washer is of substantial thickness in order to facilitate assembly, leak-tightness proves unsatisfactory if the surface flatness of the washer or of the diaphragm are not perfect in all respects. In addition, as a result of the creep deformation phenomenon which is characteristic of polytetrafluoroethylene and which is not exhibited in the case of small thicknesses but arises in the case of greater thicknesses even under relatively low compressive forces, the total thickness of the assembly consisting of seal and polytetrafluoroethylene washer progressively decreases and leak-tightness is thereby impaired. If the polytetrafluoroethylene washer is of very small thickness in order of considerable difficulty to position and maintain the washer within the groove. In any case, when cocks which are equipped in this manner are employed in hydrocarbide circulation systems, there remains a permanent hazard of swelling of the O-ring seals which causes an abnormal increase in the compressive force exerted on the diaphragm by these seals.

In other forms of construction, the seal consists of a tubular ring formed of polytetrafluoroethylene which is continuously applied against the diaphragm by means of die-stamped spring washers of the Belleville type which are placed in the bottom of the groove. Leak-tightness of the polytetrafluoroethylene ring with respect to the groove of the casing is ensured laterally on either of the two walls of the groove which are at right angles to the plane of the diaphragm by means of a rubber O-ring seal which is compressed between the polytetrafluoroethylene ring and the wall of the groove, thereby braking the displacement of said ring. Moreover, owing to the need to ensure lateral leak-tightness, it is found necessary to provide the polytetrafluoroethylene ring with an axial and radial thickness (difference between the external and internal radii) which are greater than the diameter of the chord of the O-ring seal and therefore of relatively substantial value. The creep phenomenon is liable to arise even if the extremity of said ring is machined in the shape of a single or double cone on the diaphragm side. In the case of hydrocarbides, these forms of construction are also subject to the harmful action caused by swelling of O-ring seals.

The present invention is intended to overcome the disadvantages of the different forms of construction referred to in the foregoing.

In accordance with the invention, the cock comprises a body, a closure member displaceable within said body so as to establish or interrupt a communication between two orifices formed in opposite relation within said body and in the vicinity of each orifice a seal for cooperating with said closure member. Essentially, each seal comprises a tubular ring of plastic material such as polytetrafluoroethylene which is engaged in a recess formed in the body and in leak-tight contact with a toric packing fitted in the wall of said recess, said tubular ring being provided with a deformable lip, and a Belleville washer for applying said lip in leak-tight contact with said closure member.

Further description will become apparent from the following description, reference being made to the accompanying drawings which are given solely by way of example, and in which:

FIG. 1 is a sectional view of a cock comprising of sliding diaphragm in accordance with the invention;

FIG. 2 is a detail view on a larger scale showing the seal which is illustrated in FIG. 1;

FIG. 3 is a sectional view of a spherical-plug cock in accordance with the invention.

In the form of construction which is illustrated in FIG. 1, the cock comprises a body which is constituted by flat casing elements 1 and 2 having an oblong shape. Said elements are provided respectively with connections 3 and 4 to which are coupled the pipes (not shown) for the admission and discharge of the fluid whose rate of flow is to be controlled. The casing elements are assembled by means of nuts and bolts 5 and made leak-tight by means of an O-ring seal 6. A flat diaphragm 8 having a small thickness is capable of displacement within a recess 7 formed in the casing element 1. Said diaphragm is chamfered at one end as shown at 9 and actuated at the other end by means of a crankpin 10 which is engaged with slight play within a hole formed in the diaphragm and which is rigidly fixed to an arm 11; said arm is in turn rigidly fixed to the shaft 12 of a lever which is secured to the end of said shaft by means of a locking-pin 14. Said shaft is also rotatably mounted in a bearing 15 formed by the casing element 1 and made leak-tight by means of an O-ring seal 16. The diaphragm 8 is guided in its translational movements by the lateral walls of the recess 7. Said diaphragm is capable of free vertical displacement or in other words of moving towards or away from the junction plane of the casing elements 1 and 2.

In the position in which it is illustrated in FIG. 1, the diaphragm 8 is located opposite to the orifices of the pipe connections 3 and 4. There is formed in each casing element a cylindrical recess such as the recess 17 which is concentric with the pipe connection 3 and intended to be fitted with a seal. Said seal is composed of a tubular ring 18 formed of polytetrafluoroethylene, an annular lip 19 being formed at that extremity of said ring which is adjacent to the diaphragm and an internal groove 29 being formed in the vicinity of said lip. Said ring 18 is placed externally in leak-tight contact with a small-section O-ring seal 20 which is fitted in a groove formed in the lateral wall of the recess 17. A tubular bearing member 21 is mounted within the interior of the ring 18 and adjusted within this latter with slight play while being abuttingly applied against the end wall of the recess 17. Provision is made for a variable number of spacing washers 22 which permit accurate positioning of the member 21. Said member is provided at the other end with an annular recess or counterbore 23, the depth of which is very slightly smaller than the thickness of a Belleville washer 24 which is centered and tightly fitted in said counterbore. Said Belleville washer is formed of spring steel, preferably of work-hardened stainless steel having a a thickness of 0.2 mm. and the shape of a cone having an angle of approximately 160° at the vortex.

Similarly, there is arranged opposite to the orifice 4 the other seal which consists of the polytetrafluoroethylene ring 18', the bearing member 21', the Belleville washer 24' and the spacing washers 22'.

The internal and external faces of the circular lips 19 and 19' are machined by design along plane at right angles to the axis of the tubular elements 18 and 18'. The lips 19 and 19' are of relatively small thickness and have a tendency to deform into the shape of a cone under the action of the Belleville washers 24 and 24' despite the fact that these latter are also of very small thickness.

If the position-setting of the bearing members 21 and 21' by means of the spacing washers 22 and 22' has been carried out correctly, the circular ridges 25 and 25' of the polytetrafluoroethylene rings 18 and 18' must project to the same extent respectively from the bottom 26 of the recess 7 and from the internal face 27 of the casing element 2, namely to a distance of approximately 0.2 mm. in the case of a cock having a diameter of passageway which is equal to 40 mm. MOreover, the depth of the recess 7 is on determined that, taking into account the thickness of the diaphragm 8 and the distance of projection of each ring 18 and 18', namely 0.2 mm., the theoretical residual clearance between each face of the diaphragm 8 and the ridges 25 and 25' should be of the order of 0.1 mm., this value being smaller than the deflection of the Belleville washers 24 and 24'.

In the closed position, if the pressure of the fluid which is assumed to be admitted at the inlet of the orifice 3 is zero, the diaphragm is subjected to the simultaneous and contrary action of the washers 24 and 24' which apply the annular lips 19 and 19' against each face respectively of said diaphragm and accordingly takes up a position of equilibrium at a point located halfway between the two seals. On the other hand, if the fluid is admitted under pressure at 3, the pressure will produce action on the diaphragm 8 in the direction of the arrow $F_1$ and said diaphragm will move towards the orifice 4 over a distance corresponding to the very small residual clearance previously defined and finally flatten the annular lip 19' and the Belleville washer 24'. The displacement of the diaphragm will therefore be limited to a very small value and in a positive manner even after a number of operations have been carried out since there is no further danger of creep deformation by virtue of the small thickness of the annular lip 19' and the large surface area of said lip. Under the double action of the Belleville washer 24 and of the pressure forces such as $F_2$ which are exerted on the internal surface of the diaphragm 8, the annular lip 19 is firmly applied against the diaphragm around its entire periphery and on that face of said diaphragm which is directed towards the orifice 3. Uniform application of the lip is ensured even if the diaphragm exhibits defects in surface flatness, absolute leak-tightness being obtained by virtue of the small thickness of the lip which permits unequal deformation of the latter. In practice, the thickness of the lip is chosen so that the polytetrafluoroethylene does not creep under the action of the design working stress.

When the cock is actuated and moved towards the opening position by means of the lever 13, the crankpin 10 moves to 10A as shown in chain-dotted lines in FIG. 1 and the extremity of the diaphragm moves to 9A so as to provide an entirely free and unobstructed passageway. However, said extremity 9A remains partially engaged between the lips 19 and 19' which, after being released over the remainder of their periphery, will reassume a conical shape throughout this zone under the action of the Belleville washers 24 and 24'. The deflection to which said lips are subjected is in any case of very small value inasmuch as said washers are intended to produce only very slight deformation of the lips and the deflection of said washers themselves is of very small value.

The presence of the groove 29 produces a reduction in the thrust exerted on the fluid.

At the time of the following operation which corresponds to closure, the extremity of the diaphragm 8 returns from 9A towards 9 and again gradually flattens the lips 19 and 19' under compression without causing damage to these latter by reason of the double chamfer which is formed at the extremity of the diaphragm 8 and by virtue of the low value of conical deformation which the lips undergo when they are released from the diaphragm.

The seal in accordance with the invention and as hereinabove described provides an effective remedy to the two disadvantages which were referred-to earlier, namely the difficulties caused by creep deformation of polytetrafluoroethylene and the swelling of rubber O-ring seals in the presence of hydrocarbides. In fact, in the solution which is proposed, the O-ring seal 20 which serves to make the tubular element 18 leak-tight can have a small cross-sectional area and swelling of this seal is in this case negligible. Moreover, the seal is disposed laterally with respect to the ring and therefore cannot produce any action on the annular lip 19. In the form of construction illustrated in FIG. 3, the cock has a body which comprises three portions, namely a central portion 30 and two pipe connections 31, 32 which are screwed into said central portion. A spherical plug 33 through which is pierced a passageway 34 is rotatably mounted in the central portion 30 under the action of an operating rod 35. Leak-tightness is ensured between the different portions of the body as well as the rod by means of conventional O-ring seals such as those which are designated by the reference numerals 36, 36a, 37, 37a.

A seal which is intended to cooperate with the spherical plug 33 is fitted in the vicinity of each of the orifices of the pipe connections 31, 32. As in the previous example, each seal comprises a tubular ring 38 of polytetrafluoroethylene engaged in a recess 39 which is formed in the corresponding pipe connection 31 or 32. Said ring is in leak-tight contact with a toric packing 40 which is fitted in the wall of the recess 39. The ring 38 has a deformable and inwardly directed lip 41 which is urged to a position of leak-tight contact with the spherical plug 33 by a Belleville washer 42 which is applied against a tubular member 43, this latter being placed within the recess 39 and inside the ring 38.

It would not constitute any departure from the scope of the invention to contemplate an alternative arrangement such that the annular ring of polytetrafluoroethylene which is placed within a cylindrical recess formed in the cock body in concentric relation to the orifice and which is made externally leak-tight by means of an O-ring seal located in the lateral wall of the recess as in the previous embodiments is provided with an annular lip which is directed not towards the interior but towards the exterior of the ring, said lip being subjected to the action of a Belleville washer which is applied directly against a counterbore of the body without entailing the need to make use of an auxiliary bearing member in this case.

We claim:

1. A cock comprising a body, a closure member displaceable within said body so as to establish or interrupt a communication between two orifices formed in opposite relation within said body and in the vicinity of each orifice a seal for cooperating with said closure member, wherein each seal comprises a tubular ring of plastic material such as polytetrafluoroethylene which is engaged in a recess formed in the body and in leak-tight contact with a toric packing fitted in the wall of said recess, said tubular ring being provided with a deformable lip, and a Belleville washer for applying said lip in leak-tight contact with said closure member.

2. A cock in accordance with claim 1, wherein the deformable lip is directed towards the interior of the tubular ring, the Belleville washer being applied against a tubular member which is fitted within the recess inside the ring.

3. A cock in accordance with claim 1, wherein the deformable lip extends substantially at right angles with respect to the ring when pressure is not exerted thereon.

4. A cock in accordance with claim 1, wherein the deformable lip has a substantially constant thickness and such that the plastic material does not creep under the action of the working load.

5. A cock in accordance with claim 2, wherein the tubular member is applied against the bottom of the recess by means of at least one packing member.

6. A cock in accordance with claim 1, wherein the tubular ring is provided with an internal groove in the vicinity of the deformable lip.